March 17, 1964 B. G. COPPING 3,125,369
BOTTLE GRIPPERS
Filed Feb. 24, 1961 4 Sheets-Sheet 1

INVENTOR
BRUCE G. COPPING
BY Oldham & Oldham
ATTYS.

March 17, 1964  B. G. COPPING  3,125,369
BOTTLE GRIPPERS

Filed Feb. 24, 1961  4 Sheets-Sheet 2

INVENTOR
BRUCE G. COPPING
BY
ATTYS.

March 17, 1964  B. G. COPPING  3,125,369
BOTTLE GRIPPERS

Filed Feb. 24, 1961  4 Sheets-Sheet 3

INVENTOR
BRUCE G. COPPING
BY Oldham & Oldham
ATTYS.

March 17, 1964  B. G. COPPING  3,125,369
BOTTLE GRIPPERS

Filed Feb. 24, 1961  4 Sheets-Sheet 4

INVENTOR
BRUCE G. COPPING
BY Oldham & Oldham
ATTYS.

United States Patent Office 3,125,369
Patented Mar. 17, 1964

3,125,369
BOTTLE GRIPPERS
Bruce G. Copping, Akron, Ohio, assignor to Atkron, Inc., Akron, Ohio, a corporation of Ohio
Filed Feb. 24, 1961, Ser. No. 91,405
18 Claims. (Cl. 294—87.24)

The present invention relates to apparatus for the controlled gripping, pick-up and release of articles such as bottles, and particularly to the individual members, or devices used for actual gripping engagement with bottles or other articles for lifting them, for example, from a case and transporting them a distance for deposit onto another carrier medium, such as an endless belt conveyor.

In various industries today there is a great demand for apparatus for engaging articles, such as empty soft drink bottles, lifting such bottles from a carrier case in which they have been positioned, and ultimately depositing these bottles onto other apparatus, or conveyor means for further processing, such as cleaning, bottle filling, etc. It is very desirable that these bottle gripping members or apparatus be very positive in action and such apparatus should automatically remove each and every bottle from a case when the bottles are normally positioned therein. Furthermore, these bottles should be deposited in a safe manner in a desired position for further processing thereof without any special bottle aligning action, or other handling of them being required.

In some cases returned to the factories, a bottle may be out of position, or the bottle may be inverted in the case. In such instances, apparatus developed heretofore has had difficulty in processing the cases for removing the bottles therefrom. The apparatus may either come to a complete halt, or the contents of the entire case may be missed by the bottle pick-up and removal apparatus, when an inverted bottle carrying case is processed.

The general object of the present invention is to provide a novel and improved type of bottle gripping apparatus, or means which bottle gripper is adapted or characterized by its ability to be moved vertically out of bottle engaging position and to hunt, or move sidewise to locate a bottle for gripping engagement therewith.

Another object of the invention is to provide bottle gripper and removal apparatus of the class described wherein the bottles are grasped by individual devices which are individually compressible to accommodate upside down bottles in a case of bottles so as to process the remaining bottles in the case properly and to miss only the one mispositioned bottle.

Another object of the invention is to provide both lateral and longitudinal resiliency in the positioning of a bottle gripping member so as to prevent binding of the bottles in a case as they are being pulled therefrom by relative movement between the case and the bottle gripping members.

Yet another object of the invention is to provide novel and improved apparatus of the class described wherein gripping jaws are provided in the bottle gripping members and such gripping jaws are locked in a closed position when the apparatus has been brought into engagement with the bottle and the bottle is being moved by the bottle gripping apparatus.

Further objects of the invention are to provide a pair of pivotally positioned bottle gripping jaws in bottle gripping and transport apparatus and where individual control members are provided for each pair of gripping jaws to permit the gripping jaws normally to be in a bottle grasping position but to be readily and positively removable to an open position for bottle engaging action; to provide bottle gripping members that can be associated with any desired type of apparatus for automatic entry into a bottle receiving case for grasping bottles therein and moving them out of the case upon relative movement between the case and the bottle gripper provided by means associated with the bottle grippers of the invention; to provide relatively sturdy, automatically functioning means for grasping bottles for the purposes indicated; and to provide relatively inexpensive apparatus requiring a minimum of maintenance for automatic functioning over long periods of time for the purposes stated.

The foregoing and other objects and advantages of the present invention will be made more apparent as the specification proceeds.

For a better understanding of the present invention, reference should be had to the accompanying drawings, wherein:

FIG. 1 is a semi-diagrammatic elevation of apparatus of the invention showing the means used in association with the novel bottle grippers;

FIG. 2 is an enlarged elevation of a plurality of bottle gripping means embodying the principles of the invention, which figure shows a plurality of the bottle gripping means in different positions starting with the left view of a bottle grasping position, a bottle grasping position with one side plate removed, a view similar to the previous view but with the bottle grasping jaws being in open position for bottle engaging action, and with the gripping means moved to a retracted position, respectively;

Figure 10:
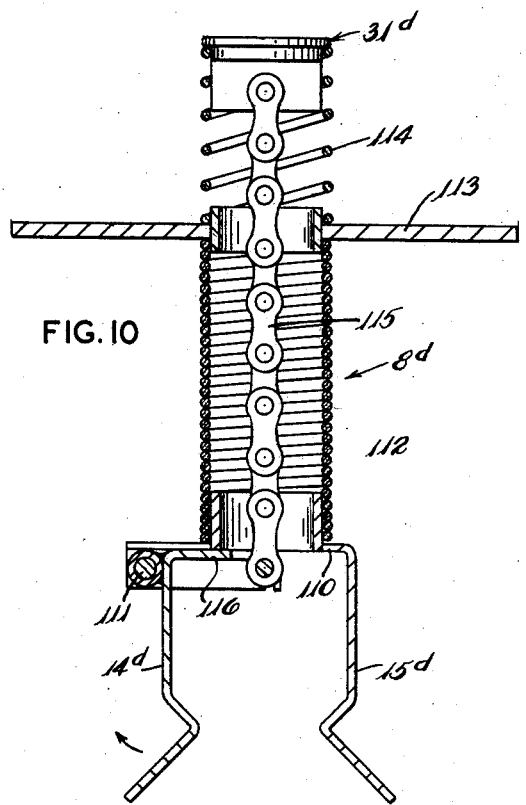
Figure 11:
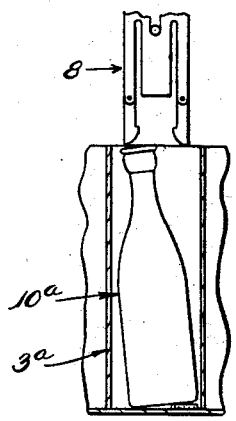
Figure 12:
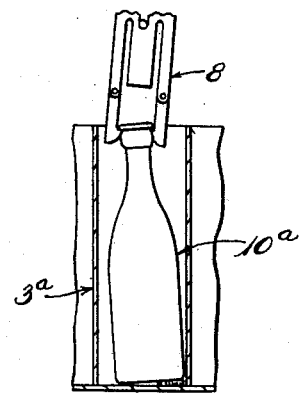
Figure 13:
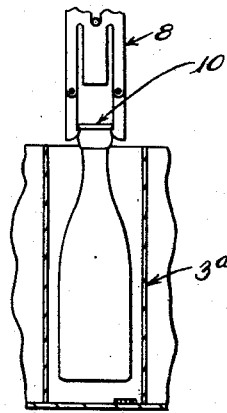

FIG. 10 is a vertical section through yet a further modification of the bottle gripping means of the invention and with the bottle grippers being in bottle engaging position; and FIGS. 11, 12 and 13 show, in sequence, a bottle gripper of the invention contacting an improperly aligned bottle in a carrier case, the lateral relative downward movement of the bottle gripper provided to enable the bottle gripper to engage the bottle, and the withdrawal action of the bottle gripper.

When referring to corresponding members shown in the drawings and referred to in the specification, corresponding numerals are used to facilitate comparison therebetween.

The present invention, generally speaking, relates to bottle or article gripping apparatus or devices adapted to be operatively associated with other mechanism by which bottles can be automatically engaged by the apparatus of the invention, lifted from their supporting or carrying cases, and be transported to a remote point for deposit in a desired location. The novel gripping apparatus in general includes a carrier frame, a pair of gripper jaws at least one of which is pivotally positioned and with both jaws being operatively carried by or positioned on the carrier frame, a control member, means operatively securing the control member resiliently to the carrier frame for movement of the control member towards and away from the frame but being normally urged away from the frame, and connecting means that operatively extend between and connect the control member to at least the one pivotally positioned gripper jaw to move it from a normal locked bottle gripping position to an extended bottle engaging or releasing position when the control member is moved towards the carrier frame.

Attention is now particularly directed to the details of the structure shown in the drawings, and overall bottle engaging and transporting apparatus is indicated as a whole by the numeral 1. Such apparatus 1 normally will include some type of an infeed, or supply conveyor 2 which is adapted to support bottle carrying cases 3 thereon and feed them into the apparatus. A receiving conveyor 4 is also provided and it is adapted to receive bottles withdrawn from the cases 3 and transport them to other apparatus for further processing, as desired.

The apparatus 1 includes a bottle engaging and transfer conveyor 5 which is positioned on and suitably driven by conventional members, such as sprockets 6 and 7. This conveyor 5 includes two parallel side chains 5a that position the bottle engaging members therebetween.

Figure 1:
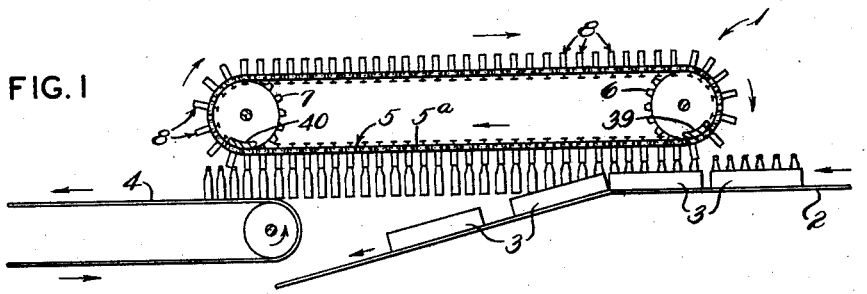

The actual novel and improved bottle grippers of the invention are indicated as a whole by the numeral 8. Normally a plurality of these bottle grippers 8 are secured in transversely spaced relationship to means, such as a carrier frame, or positioning bar 9, with the individual carrier frames 9 provided being secured to the conveyor 5 at desired longitudinally spaced portions thereof. FIG. 1 of the drawings best shows how a plurality of these carrier frames 9 and bottle grippers 8 are secured to the conveyor 5 and extend downwardly therefrom when one reach of the conveyor 5 extends adjacent to but above the input conveyor 2. The apparatus is adapted and designed to function automatically and the bottle grippers 8 are provided for automatic engagement with individual bottles 10 in the cases 3 for firmly grasping such bottles to withdraw them from the cases 3 as the conveyors 2 and 5 move relatively to each other in a vertical direction to provide the desired bottle withdrawing action.

Figure 2:
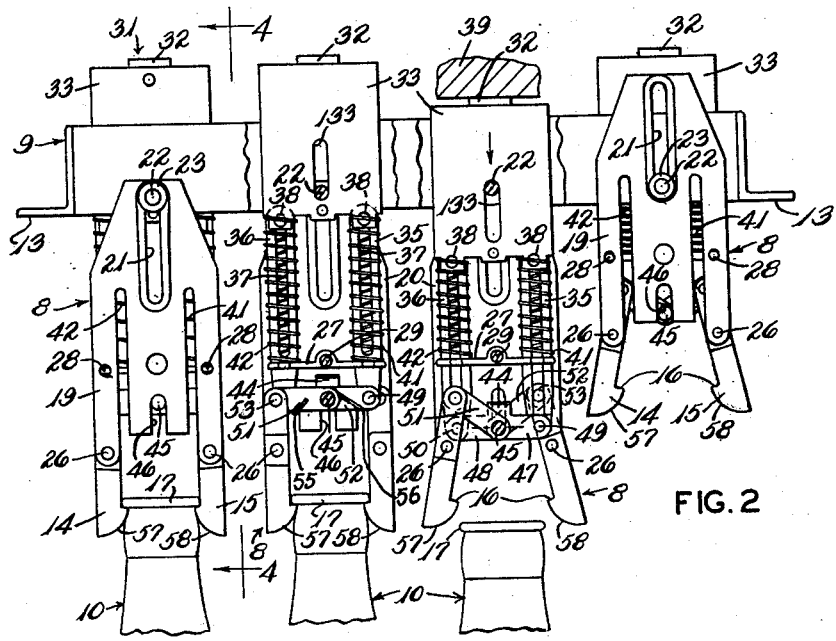
Figure 3:
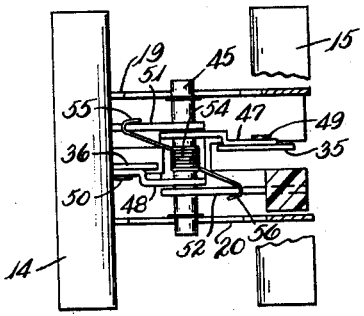
FIG. 3 is an enlarged fragmentary bottom view, partly in section, of the bottle gripper means.
Figure 4:
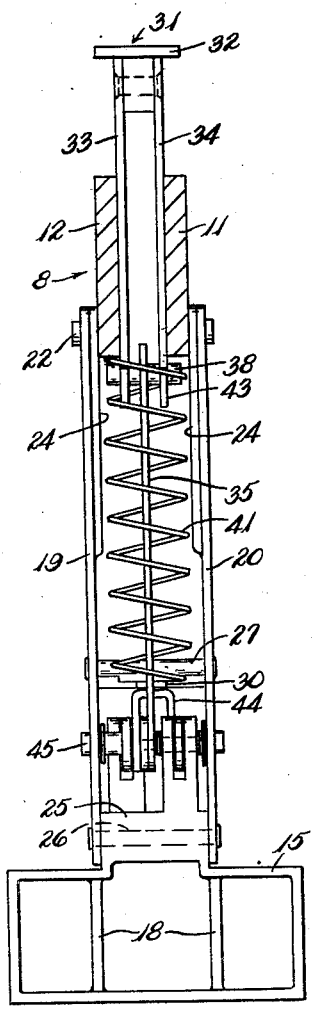
FIG. 4 is an enlarged vertical section taken on line 4—4 of FIG. 2.

The carrier frames 9 may be of any suitable construction, but FIGS. 2 through 4 best show that such members may comprise a pair of vertically positioned, spaced metal plates 11 and 12 which preferably are secured together, as by means of end brackets 13. These end brackets 13 usually are the portion of the carrier frames that engage the conveyor 5, as by being bolted to the chain 5a. A pair of gripper jaws 14 and 15 are provided in each of the bottle grippers 8, and the drawings show that the gripper jaws 14 and 15 extend longitudinally of the conveyor 5 a greater distance than the longitudinal depth of the carrier frame 9, and this facilitates having the bottle grippers 8 engage with bottles in the cases 3 even though the cases are slightly out of position, or the bottles are slightly out of position within the cases. These gripper jaws 14 and 15 may be of any desired construction, but preferably include inwardly extending flanges 16 on each of the jaws adjacent the lower end thereof for physical interlocked engagement with a bead 17 provided on the upper end of each of the bottles 10 as is conventional in most bottle constructions. These gripper jaws 14 and 15 may have reenforcing ribs 18 provided on the outer surfaces thereof. Preferably the gripper jaws 14 and 15 are made from some low friction, durable material, such as a moldable plastic; nylon being one example of a plastic that is very suitable for use in forming the gripper jaws 14 and 15.

A pair of positioning members, frame means, or side plates 19 and 20 are provided in each of the bottle grippers 8, and these side plates 19 and 20 are operatively carried by the carrier frames 9 for vertical movement with relation thereto, as by having longitudinally extending slots 21 provided in the upper ends of each of the side plates 19 and 20. The side plates 19 and 20 are attached to the carrier frame by connection means including a pin 22 extending through the slots 21 and engaging the carrier frame and having lock washers or discs 23 at the ends of the pin for securing the side plates in position. These slots 21 may be formed in inwardly extending reenforcing and supporting flanges 24 formed in the side plates. As indicated in the drawings, the side plates 19 and 20 and the bottle grippers 8, as a whole, are dependent from the carrier frames 9 to extend downwardly therefrom, but are movable vertically upwardly with relation thereto, as units, as hereinafter described in more detail. The side plates 19 and 20 are held in spaced relationship adjacent their lower ends by end shoulders formed on the pins 26 on which the gripper jaws 14 and 15 are journalled by the pins 26 engaging upper ends 25 of the gripper jaws. The upper ends 25 of the gripping jaws 14 and 15 are of L-shape but are reversed on the different gripper jaws 14 and 15 to have the upper leg of each of the gripper jaws positioned adjacent a different one of the side plates 19 and 20. The gripper jaws 14 and 15 are fulcrumed on the pins 26 to position the gripper jaws for pivotal action with relation to the side plates and to provide a low friction connection therebetween.

A stop or positioning plate 27 is also secured between the side plates 19 and 20 intermediate the upper and lower margins thereof. Such stop plate 27 may be formed from a suitable plastic material, such as nylon, and is of rigid construction. It is shown as provided with small tips, or pin-like extensions 28 thereon for engaging apertures formed in the side plates to retain the stop or positioning plate 27 in a desired position. A rivet 29 also engages the side plates and positioning plate 27 to secure it in position and to retain the side plate assembly together. End slots 30 are provided in the lateral margins of the stop plate 27 for a use to be described hereinafter in more detail.

Each of the bottle grippers 8 is provided with a control member 31 at the upper portion thereof. This control member 31 extends vertically above the carrier frame 9 and is shown to include a low friction, hard, but durable plastic block 32, such as one made from nylon, that is fixedly secured to a pair of plates 33 and 34 that are in spaced relationship to each other and slidably engage the metal plates 11 and 12 intermediate the adjacent margins thereof. The plates 33 and 34 extend below the metal plates 11 and 12 and pivotally engage a pair of connecting links 35 and 36 below the metal plates 11 and 12. These connecting links have longitudinally extending lost-motion slots 37 therein and the connecting links extend down through the slots 30 provided in the stop plates 27. The connecting links 35 and 36 are preferably secured to the plates 33 and 34, as by means of pins 38, which are carried by the plates 33 and 34, extend through the slots 37, and are long enough to extend out to engage the lower surfaces of the metal plates 11 and 12 and prevent any vertical movement of the control member 31 upwardly beyond a predetermined stop position a fixed distance above the upper surfaces of the metal plates 11 and 12. The block 32 is specifically positioned to extend above adjacent portions of the conveyor 5 when the bottle grippers 8 are secured thereto so that such blocks 32 will engage members, such as cams 39 and 40, that are operatively secured in association with the conveyor 5 adjacent each of the sprockets 6 and 7. The cams 39 and 40 cause the control member and associated means to be moved vertically downwardly with relation to the metal plates 11 and 12 for control actions, as hereinafter described. A pair of coil springs 41 and 42 are individually engaged with the links 35 and 36 and extend along the axes thereof, to bear on the stopper or positioning plate 27 at the lower spring ends. The upper ends of these springs 41 and 42 are compressed against the lower margins of the plates 33 and 34 to provide an effective stop for the spring action to move the side plates 19 and 20 and the bottle gripper 8 downwardly with relation to the carrier frame 9. The springs also receive extensions 43 extending downwardly from the plates 33 and 34 to aid in retaining the springs in position and urging such plates and the control member 31 as a whole upwardly with relation to the metal plates 11 and 12.

In order to complete the bottle grippers 8, connecting means are provided to connect the gripper jaws 14 and 15 to the control member 31 so that movement of the control member 31 relative to the metal plates 11 and 12 will provide the desired open or bottle engaging or releasing positioning of the gripper jaws 14 and 15, and with the gripper jaws being retained in bottle grasp positions when the control member 31 is at its normal released position. Such connecting means are shown to comprise a connector 44 of generally inverted U-shape in section and the upper surface of which abuts against the lower margin of the stop, or positioning plate 27 to retain the connector 44 in a normal, or fixed position with relation to a control pin 45 on which the connector 44 is journalled. The connector, or control pin 45 is slidably positioned in, and its movement is limited by, longitudinally extending slots 46 provided in each of the metal side plates 19 and 20 at the lower ends thereof, which slots terminate at the lower margins of the side plates. The connector 44 has two oppositely directed horizontally extending arms 47 and 48 with the arm 47 being adjacent the side plate 19 and the arm 48 being adjacent the side plate 20 for individual engagement with and control of the gripping jaws 14 and 15, as described in more detail hereinafter. The arms 47 and 48 pivotally engage the lower ends of the connecting links 35 and 36, respectively, as by means of pins 49 and 50, as best shown in FIGS. 2 and 3 of the drawings.

Hence, as hereinafter explained more fully, on downward movement of the control member 31 and the block 32, the connecting links 35 and 36 are likewise moved downwardly to protrude farther past the stop plate 27, and such movement causes the connector 44 to ride downwardly on the control pin 45 in the slots provided therefor. This downward movement of the connector 44 is translated to the individual gripper jaws 14 and 15 through the control pin 45 by means of toggle arms 51 and 52, respectively, that pivotally extend between and connect the control pin 45 to the upper ends 25 of the gripper jaws 14 and 15. Rivets, pins 53, or similar members, connect the toggle arms 51 and 52 to the gripper jaw upper ends 25.

The gripper jaws 14 and 15 are aided in moving to their bottle releasing positions by means of a coil spring 54 carried by the control pin 45 and with the ends 55 and 56 of the spring 54 individually engaging the lower edges of the toggle arms 51 and 52, respectively, to urge such toggle arms upwardly and inwardly to pull the upper ends 25 of the gripper jaws inwardly for the desired opened, or bottle releasing and/or engaging positioning of these gripper jaws when articles are to be discharged or picked up. The reaction forces on the coil spring 54 from the upwardly directed forces of the spring ends or arms 55 and 56 urge the control pin 45, on which the spring 54 is positioned, downwardly. Such forces on the control pin 45 are transferred through the arms 47 and 48 of the connector 44, which is mounted on the control pin 45, to the connecting links 35 and 36 to urge them downwardly at all times. Hence, when such connecting links are released for downward movement, for example, when the control member 33 is moved downwardly, jaw opening action is automatically effected.

From the foregoing, it will be seen that the side plates 19 and 20 on which the entire operative assembly positioning the gripper jaws 14 and 15 is carried is physically positioned on the carrier frame 9 by the pin 22 for lateral movement with relation thereto. This permits a lateral hunting, or locating action of the gripper jaws with relation to the top of a bottle, and the drawings clearly show that the adjacent inner surfaces of the gripper jaws at the lower ends thereof diverge outwardly, as indicated at 57 and 58, to aid in permitting the gripper jaws to slide down or move down vertically over the upper end of a bottle 10. The use of the positioning pin 22 and the spring mounting of these side plates 19 and 20 in the bottle grippers 8 also permits the entire side plate assembly to be moved vertically upwardly of the carrier frame 9 should the bottle grippers or gripper jaws 14 and 15 either or both contact some improperly positioned bottle or article in one of the cases 3 so that they will not be able to engage with such article properly to remove it from the case 3. However, each individual bottle gripper 8 can have any vertical movement required for this bottle clearance action so that the remaining bottle grippers provided on the conveyor 5 will function properly and only the one or more improperly positioned articles in the cases 3 would not be withdrawn therefrom by the automatic functioning of the apparatus of the invention.

The entire assembly does have the toggle arms 51 and 52 in substantially straight line relationship to each other, as shown in FIG. 2, when the bottle gripper 8 is in its normal position at which time the gripper jaws 14 and 15 hence are locked in closed, or operative engagement with the neck, or top portion of the bottle 10. At such position, outward pivotal movement of the gripper jaws is prevented by the straight line relationship between the toggle arms 51 and 52 which thereby prevent any inward swinging of the upper ends 25 of the gripper jaws. It should be noted that the control member 31 does not limit any lateral movement of the side plate assembly as the positioning plates 33 and 34 of the control member are likewise free for lateral pivotal or swinging action intermediate the carrier metal plates 11 and 12.

It will be realized that the bottle grippers 8 are positioned in any desired relationship to each other to correspond to the normal locations of members provided in the cases 3 being processed. Thus the carrier frames 9 can be changed on the conveyor 5 for spacing them in different longitudinally spaced relationship to each other, and the individual carrier frames 9 can have two, three, four or more individual bottle grippers 8 provided thereon, again as determined by the bottle or article positioning in the cases being processed.

Figure 5:
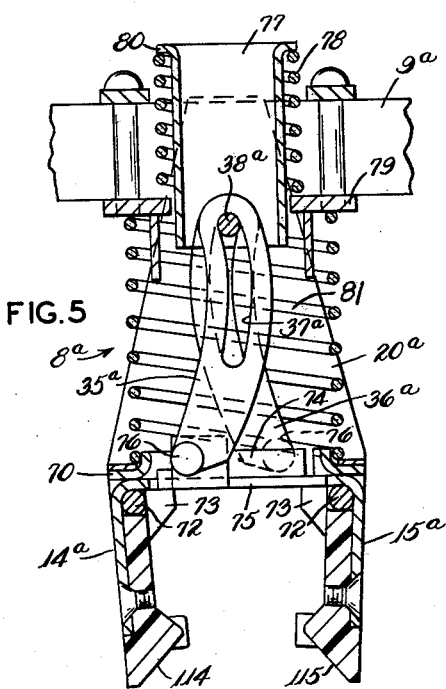
FIG. 5 is a vertical section through a modified embodiment of the bottle gripper means of the invention.
Figure 6:
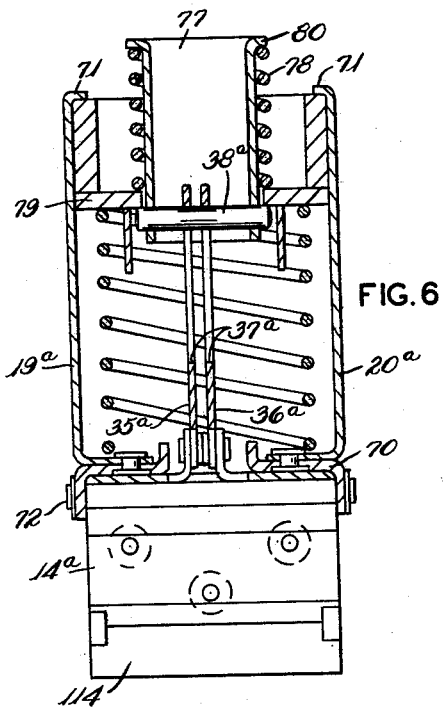
FIG. 6 is a front to rear vertical section through the bottle gripping member of FIG. 5.

Reference now is particularly directed to the modified bottle gripper 8a of the invention shown in FIGS. 5 and 6 of the drawings. This bottle gripper 8a is shown positioned on a carrier frame 9a and with a pair of metal side plates 19a and 20a being secured together adjacent their bottom margins by a cross plate 70. The upper edges of the side plates 19a and 20a are flanged over at 71 to engage the upper surface of the carrier frame 9a whereby the side plate assembly in this bottle gripper 8a is movably associated with and extends downwardly from the carrier frame 9a. The gripper jaws 14a and 15a, in this instance, are shown as being made from metal with plastic inserts 114 and 115, but they may be made solely from plastic or other material, as desired, and they are pivotally positioned, as by means of pins 72 on downwardly extending ears, or flanges 73 provided on the cross plate 70. Each of the jaws 14a and 15a has a horizontally directed inwardly extending control arm 74 and 75, respectively, provided thereon, and these arms are pivotally secured, as by pins 76, to the lower ends of connecting links 35a and 36a provided in the bottle grippers. The control member in this instance comprises a tubular metal member 77 that extends slightly above the carrier frame 9a and which connects to the upper ends of the connector links 35 and 36, as by means of a pin 38a. A coil spring 78 extends between a cross plate 79 on the carrier frame and an upper flange 80 provided on the tubular control 77 to urge such tubular control 77 normally upwardly to extend above the carrier frame 9a. The connector pin 38a extends through longitudinally extending slots 37a provided in these connecting links 35 and 36 to permit lost motion between the tubular control 77 and the gripper jaws 14a and 15a, when required.

Normally the entire side plate assembly on the members 19a and 20a is urged downwardly of the carrier frame 9a by a coil spring 81 compressed between the cross plates 70 and 79 in the assembly but with the entire side plate assembly being movable upwardly of the carrier frame 9a, if an improperly positioned bottle or other article is struck by the gripper jaws, which movement is permitted by the coil spring 81 in the assembly. Normally the connecting links 35a and 36a will retain the gripper jaws in their bottle grasp positions, but upon downward movement of the tubular control 77 when brought into engagement with a control cam or the like, then such gripper jaws are moved to their laterally outermost positions for bottle release or bottle engaging action, as desired. Individual springs may be associated with the bottle grippers 14a and 15a on the support pins 72 to urge such jaws normally to their outermost positions for positive movement thereto when released by downward movement of the tubular control 77.

Figure 7:
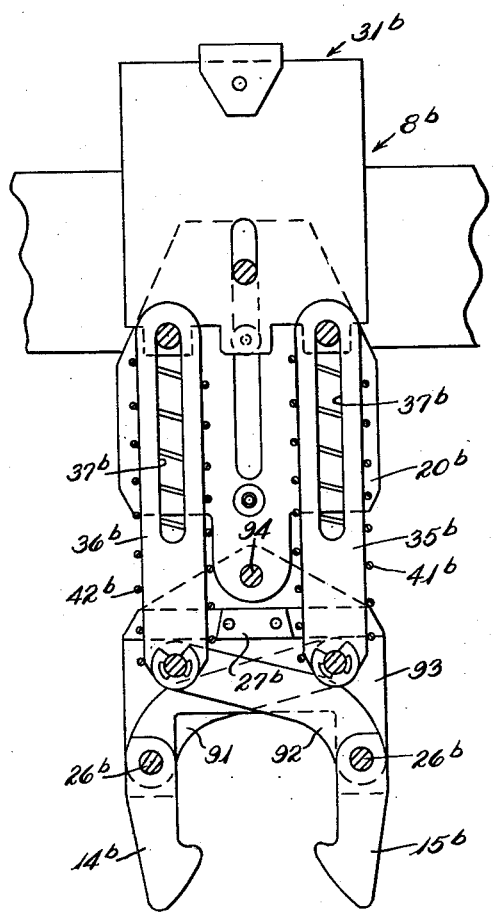
FIG. 7 is a front elevation of a further modified type of bottle gripping means of the invention with a side plate means thereof removed.

FIG. 7 of the drawings shows another modified type of a bottle gripper 8b quite similar to that structure shown in FIGS. 1 through 4, but with the side plate means of the bottle gripper being more of an articulated construction, and with direct control arms being provided on the bottle grippers rather than the toggle controls shown hereinbefore. In this bottle gripper 8b, the control member 31b is generally of the same construction as that referred to hereinbefore, but with the gripper jaws 14b and 15b having what may be integral arms 91 and 92, respectively, extending upwardly and laterally inwardly of the bottle gripper from the pins 26b on which the bottle grippers are fulcrumed. In this instance, the side plates provided in the assembly, and with only the plate 20b being shown, each has an extension 93 provided thereon and pivotally secured thereto, as by means of a support shaft, or pin 94. Coil springs 41b and 42b, like those shown in FIGS. 1 through 4, urge the side plate assembly downwardly in the bottle grippers 8b by engaging a stop or positioning plate 27b secured to and extending between the side plate extensions 93 to aid in maintaining them in desired spaced relationship and to provide an end stop for the springs. Connecting links 35b and 36b extend between the control member 31b and the upper ends of the gripper jaw arms 91 and 92 so that downward movement of the control member will cause the gripper jaws 14b and 15b to move from their locked bottle grasp positions to bottle release, or engaging positions with the jaws being in their laterally outermost positions. Spring means, not shown, may operatively engage the arms 91 and 92, or the gripper jaws 14b and 15b to urge them to their bottle release and engaging positions. Again, lost motion slots 37b are provided in the connector links to permit the entire assembly to move upwardly vertically with relation to the carrier frames (not shown) provided for the bottle grippers 8b if an upside down bottle is hit by the bottle grippers.

Figure 8:
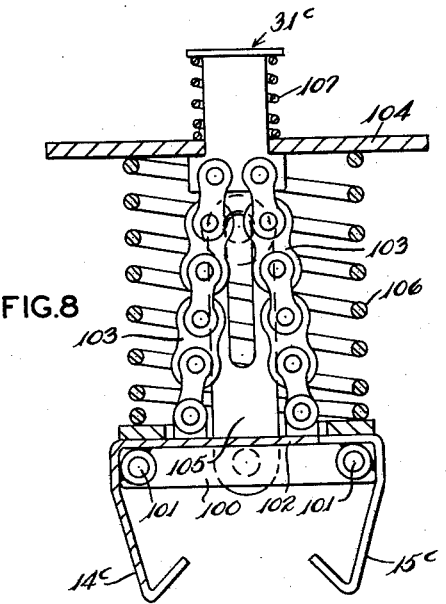
FIG. 8 is a vertical section through a further modification of the bottle gripping means of the invention with the bottle gripping jaws being in closed or gripping position.
Figure 9:
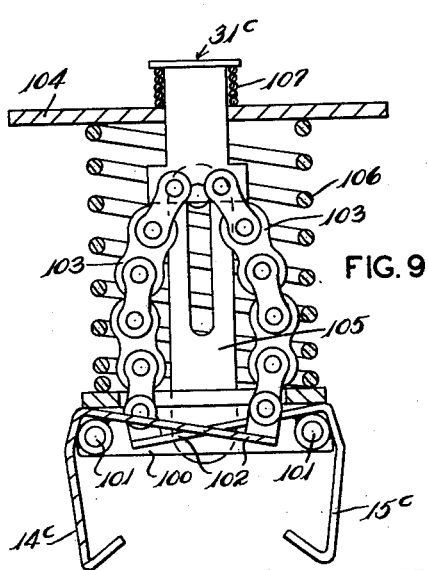
FIG. 9 is a vertical section, like FIG. 8, only with the bottle gripping jaws being released.

The modified construction shown in FIGS. 8 and 9 is most similar to the construction shown in FIGS. 5 and 6, and again, two individual spring members are provided to control the positioning of bottle gripper jaws 14c and 15c pivotally carried by a lower cross plate 100 provided in the apparatus. The gripper jaws are pivotally positioned on pins 101 journalled on the cross plate 100 and spring means (not shown) may be provided on these pins to urge the jaws to their laterally outmost, or bottle release positions. Arms 102 are usually formed integrally with or secured to the gripper jaws 14c and 15c integrally therewith whereby they can be moved and the position of the gripper jaws controlled by means of connecting members, in this instance shown in the form of chains 103, which extend up along the axis of the bottle gripper unit to engage a control member 31c provided in this embodiment of the invention.

The control member 31c is normally urged upwardly of a top plate 104 by a spring 107 based on the top plate 104 which would be secured to a suitable carrier frame (not shown) provided for the bottle gripper. The cross plate 100 is secured to the top plate 104 for lost motion with relation thereto by slotted support links 105 pivotally engaged with and extending between the top plate and cross plate in the apparatus. A conventional coil spring 106 is compressed between the plates 100 and 104 for normally maintaining the cross plate in its lowermost position but permitting vertical upward compression of the entire cross plate and gripper jaw assembly when contacting an improperly positioned bottle, for example. The coil spring 106 may be secured to the plate 104 in any suitable manner (not shown). The pair of chains 103, 103 provided individually extend between the lower end of the control member 31c and the arms 102 provided on each of the gripper jaws. Naturally the top plate 104 may be thickened in a vertical direction and may be of the general depth, or height of the carrier frame shown in the other embodiments of the invention. Again, however, the entire bottle engaging assembly of the invention is adapted for lateral pivotal movement in the apparatus of the invention when operatively positioned in association with a carrier conveyor to give a lateral hunting or finding action to aid the gripper jaws for engaging and/or finding a bottle positioned in an associated bottle carrier case for automatic removal of the bottle from the case.

Yet a further bottle gripper 8d of the invention is shown in FIG. 10. In this instance, a pivotally positioned bottle gripper jaw 14d is provided and a fixed position jaw 15d is shown. The fixed jaw 15d may be formed as part of a lower cross plate 110 to which the jaw 14d is pivotally secured, as by a pin 111. A resilient member, such as a coil spring 112, is compressed between an upper plate 113, which would be similar to the carrier frame 9 provided in the other embodiments of the invention, and the upper surface of the cross plate 110 to permit lateral flexibility of the gripper jaw assembly.

In this instance, a control member 31d provided is connected to the top plate 111 by a spring 114 and normally urged upwardly therefrom, whereas a flexible member, such as a link chain 115, extends down through the axes of the springs 112 and 114 to be pivotally connected to a control arm 116 provided on the pivotal jaw 14d. Thus when the control member 31 is pushed down, the pivotal jaw 14d can be moved by a spring (not shown) or is moved by gravity, to its laterally outer position for bottle engaging, or release action. Again, the control members provided in the apparatus extend upwardly from a top plate, or carrier plate in the assembly and the apparatus is adapted for functioning generally in the same manner, as the other embodiments of the invention described.

It should be recognized that the article engaging and transporting and depositing conveyor 5 may be of any desired construction. The cams 39 and 40 provided in association with this conveyor 5 may be more in the form of elongate plates engaging the conveyor in a horizontal stretch thereof, rather than the rather short, arcuate types of cams shown in the drawings. Thus the bottle grippers of the invention can be held in their open, or bottle grasping positions for a longer period of their passage along with the conveyor 5 than that of the specific apparatus shown. Furthermore, the particular relationships between the conveyors 2 and 5 may be different from that shown inasmuch as the cases may be brought up into association with the conveyor, which may have a horizontal stretch during which the bottle grippers are at their bottle engaging positions, and then have the case moving conveyor 2 move downwardly with relation to this horizontal stretch or reach in the conveyor 5 to withdraw the bottles from the cases. Likewise, the bottle grippers of the invention can be opened for any desired length of their travel when the bottles are brought into association with the discharge conveyor 4, or similar means provided.

It also will be recognized that the cases 3 may be of the so-called full depth type wherein they are of the height of the articles, containers, or bottles received therein.

FIGS. 11, 12 and 13 show the very desirable hunting or locating action of the bottle gripper means of the invention where the article 10a is out of alignment with the gripper means. FIG. 11 shows how one of these bottle grippers 8 can have one of the jaws thereof resiliently contact the upper end of an improperly positioned article, and the bottle gripper 8 will then slide, or pivot laterally in the apparatus so that the bottle gripper and its support can move down into a case 3a shown for engaging a bottle or container therein, as indicated in FIG. 12. Then the relative vertical movement between the conveyor 5 and the case positioning means will provide for withdrawal action of the containers in the cases as roughly indicated in FIG. 13.

It is a further important element of the present invention that the actual bottle engaging jaws 14 and 15 are moved to their open, or bottle engaging or releasing positions by relative movement of the side plates 19 and 20 with relation to the carrier member 9. Hence, even though the control member 31 has not been moved downwardly, the side plates 19 and 20 and means carried thereon are free for relative movement with relation to the carrier bar 9 and such action or upward movement of the side plates will open the jaws for engaging a bottle, or similar container when the upward movement is produced by the jaws contacting a bottle, or container to move the jaw assembly upwardly. Hence, in some instances, it may be desirable to pick up articles without use of the control member 31, or equivalent member, and the cam 39 or equivalent may be omitted if other means are provided to affect this relative vertical movement between the carrier frame and the side plates for controlled bottle grasping action. The entire case 3a, for example, could be moved upwardly with relation to the gripper jaws 14 and 15 and their positioning means to engage the containers 10a with the bottle grippers 8 to push such bottle grippers 8 upwardly to open the jaws 14 and 15 which then would spring down over the upper ends of the containers to grasp them. Such upward movement would produce a toggle opening action by moving the control pin 45 downwardly in its positioning slot 46.

In the various embodiments of the invention, the side plates 19 and 20, or equivalents, may be considered the frame means for the bottle or article grippers. The frame means, or side plates are movable laterally of the carrier frames, which lateral direction is parallel to the plates, or bars 11 and 12, and they also are movable vertically which direction is normally along the longitudinal axes of the side plates 19 and 20. The pins 22 are received in slots 133 in the plates 33 and 34 to control the pivotal movement of the plates and control member 31 on the carrier frame 9.

The term "bottle" is broadly used in the specification and claims to refer to cans, containers, bottles and articles generally similar thereto.

From the foregoing description, it will be seen that bottle, or article gripper means of the invention can be provided in a variety of forms, but that all of these bottle, or similar article grippers have desired resilient positioning on the carrier frame means and with all of the bottle grippers being adapted to have a lateral hunting or finding action for bottles, and to be movable vertically upwardly of the assemblies to reject or miss, individually, an improperly positioned bottle, or article in the cases. The apparatus is adapted for automatic control by the associated cam and conveyor means, as shown, and will provide an automatic action for removing bottles, or other articles from carrier cases and depositing them on another desired member. Hence it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. In bottle or article gripping apparatus,
an elongate carrier frame,
a plurality of positioning members operatively secured to longitudinally spaced portions of said carrier frame and extending downwardly therefrom for limited vertical movement towards and away from said carrier frame,
a pair of gripping jaws pivotally secured to each of said positioning members adjacent the lower ends thereof,
a control member for each of said pairs of gripping jaws operatively carrier by said carrier and extending thereabove,
said positioning members each including a pair of spaced plates, a said control member being received between each of said pairs of plates,
means including a resilient member operatively engaging said positioning members and said control means to urge said control members vertically upwardly from said carrier frame but to permit movement of said control members towards said carrier frame, and
connecting means including a spring means operatively engaging and extending between said control members and said gripping jaws to move them from normal bottle grasping positions to bottle receiving positions when said control members are moved towards said carrier frame.

2. In an article or bottle gripping apparatus as in claim 1;
said connecting means including toggle means for each of said gripping jaws positioned in extended relation when a said gripping jaw is in its bottle grasping position; and
said spring means operatively engage both said positioning members and said control members to permit relative movement therebetween and individual movement of each of said positioning and control members with relation to said carrier frame.

3. In bottle or article gripping apparatus,
an elongate carrier frame,
a plurality of dependent positioning members operatively secured to spaced portions of said carrier frame for limited vertical movement towards and away from said carrier frame,
a pair of gripping jaws pivotally secured to each of said positioning members adjacent the lower ends thereof but extending forwardly and rearwardly beyond said carrier frame,
a separate control member for each of said pairs of gripping jaws slidably and operatively carried by said carrier frame and extending thereabove,
a pair of parallel coil spring means carried by each of said positioning members and extending between said positioning members and said control members to urge each away from said carrier frame in opposite vertical directions but to permit either or both of such members to move towards said carrier frame,
a control pin engaging each of said positioning members for limited vertical movement with relation thereto;
a lost motion connecting link means connecting each of said control members to the said control pin in each said positioning member to move it upon relative movement of a said control member relative to said carrier frame;
toggle arms pivotally and individually connecting each said control pin to said gripping jaws to control the positioning thereof, said toggle arms being aligned when said control member is released to lock said toggle arms in article retaining positions; and a spring member engaging said toggle arms to urge said gripping jaws to article releasing position.

4. In bottle or article gripping apparatus,
an elongate carrier frame,
a plurality of positioning members operatively secured to spaced portions of said carrier frame for limited vertical movement towards and away from said carrier frame,
a pair of opposed gripping jaws pivotally secured to each of said positioning members adjacent the lower ends thereof,
a control member for each of said pairs of gripping jaws slidably carried by said carrier frame and extending thereabove,
said positioning members each including a pair of spaced parallel plates, a said control member being received between each of said pairs of said plates,
a pair of parallel spring means operatively engaging said positioning members and said control members to urge each away from said carrier frame in opposite vertical directions but to permit either or both of such members to move towards said carrier frame,
a control arm engaging each of said gripping jaws, and
link means having elongate lost motion slots therein connecting each of said control members to the said individual control arms for each of said gripping jaws to move said gripping jaws to an article release position upon relative movement of a said control member towards said carrier frame and to permit said positioning members to move towards said carrier frame.

5. In a bottle, or article gripping apparatus,
a carrier frame,
a dependent positioning means secured to said carrier frame and movable in lateral and vertical directions with relation to said carrier frame,
a pair of pivotal gripper jaws operatively carried by said positioning means and extending downwardly therefrom,
a pair of parallel coil spring means engaging said positioning means for urging said positioning means downwardly from said carrier frame, and
a pair of connecting means each having a section received within one of said coil spring means and operatively extending between and connecting said positioning means to said gripper jaws to move them from a normal locked bottle gripping position to a bottle engaging position when said positioning means is moved towards said carrier frame.

6. In bottle or article gripping apparatus,
a carrier frame,
a positioning member slidably engaging said carrier frame and extending downwardly therefrom for limited vertical movement towards and away from said carrier frame and for pivotal movement in a plane with relation to said carrier frame,
a pair of gripping jaws pivotally secured to said positioning members adjacent the lower end thereof,
a control member for said pair of gripping jaws slidably carried by said carrier frame and extending thereabove,
said control member telescoping between portions of said positioning member,
a pair of parallel spring means operatively engaging said positioning member and said control member to urge them away from said carrier frame in opposite vertical directions but to permit at least said control member to move towards said carrier frame, and
means operatively connecting said control member to said gripping jaws to move them to open position upon relative movement of said control member towards said carrier frame,
said spring means and connecting means controlling said gripping jaws to position them normally in a closed article gripping position and to resiliently center said positioning member on said carrier frame.

7. In a bottle, or article gripping apparatus,
a carrier frame,
an elongate positioning means,
said positioning means having a lost-motion slot connecting means therein securing said positioning means to said carrier frame to extend downwardly therefrom and to permit vertical movement of said positioning means,
a pair of pivotal gripper jaws operatively carried by said positioning means,
a control means slidably positioned by said carrier frame,
spring means operatively engaging said positioning means and said carrier frame to provide movement of said positioning means toward and away from said carrier frame by said connection means but normally to urge said positioning means away from said carrier frame, and
second connecting means operatively extending between and connecting said control means to said gripper jaws to move them from a locked bottle gripping position to bottle releasing position when said control means is moved towards said carrier frame, said first connection means permitting such movement by said lost-motion slot therein.

8. Apparatus as in claim 7 where said spring means urge said first connecting means normally to an extremity of said slot in said connection means,
said control means extending above said carrier frame for vertical movement with relation thereto,
said positioning members each including a pair of spaced plates, a said control member being received between each of said pairs of plates,
elongate slotted link means, operatively engaged with said positioning means, connect said gripper jaws to said control means to permit lost motion therebetween and to move said gripper jaws to bottle engaging and/or releasing position when said control means is moved towards said carrier frame.

9. In a bottle, or article gripping apparatus,
a carrier frame,
an elongate positioning means,
lost-motion connection means securing said positioning means to said carrier frame to extend downwardly therefrom but to permit pivotal and vertical movement of said positioning means with relation to said carrier frame,
a pair of gripper jaws pivotally and operatively carried by said positioning means,
a pair of parallel coil spring means operatively engaging said positioning means and said carrier frame to permit movement of said positioning means toward and away from said carrier frame by said connection means but normally to urge said positioning means away from said carrier frame, and
connecting means including a resilient member operatively connecting said gripper jaws to move them from a closed bottle gripping position to an open position when said positioning means is moved towards said carrier frame, pivotal movement of said positioning means having no effect on said connecting means.

10. In bottle or article gripping apparatus,
a carrier frame,
a positioning member having a vertically extending slot therein,
means engaging said slot and said carrier frame to attach said positioning member thereto for limited vertical movement towards and away from said carrier frame,
a pair of gripping jaws pivotally secured to said positioning member adjacent the lower end thereof, a control member for said pair of gripping jaws slidably carried by said carrier frame and extending thereabove, a pair of parallel coil spring means carried by said positioning member and bearing against said control member to urge said control member vertically upwardly from said carrier frame and said positioning member downwardly but to permit movement of both of said members towards said carrier frame, a longitudinally slotted link received in each one of said coil spring means, means securing said control member to the upper ends of said links by engaging the slots therein, means operatively securing the lower ends of said links to said gripping jaws, and spring means engaging said last-named means and urging said links downwardly and said gripper jaws to their open position.

11. In bottle or article gripping apparatus, a carrier frame, a positioning member, means engaging said positioning member and said carrier frame to attach it to said carrier frame for limited vertical movement towards and away from said carrier frame, a pair of gripping jaws pivotally secured to said positioning member adjacent the lower end thereof, a control member for said pair of gripping jaws slidably carried by said carrier frame and extending thereabove, a pair of vertically extending coil spring means carried by said positioning member in spaced parallel relation and bearing against said control member to urge said control member vertically upwardly from said carrier frame and said positioning member downwardly but to permit movement of both of said members towards said carrier frame, a longitudinally slotted link telescopically received in each one of said coil spring means, means securing said control member to the upper ends of said links by engaging the slots therein and normally being retained at the upper ends of said slots by said coil spring means, means operatively securing the lower ends of said links to said gripping jaws, and spring means engaging said last-named means and urging said links downwardly and said gripper jaws to their open position to aid in gripper jaw opening when said control member is moved towards said carrier frame.

12. In bottle or article gripping apparatus, a carrier frame, a positioning member, means engaging said carrier frame to attach said positioning member thereto for limited vertical and pivotal movement in a plane, a pair of gripping jaws pivotally secured to said positioning member adjacent the lower ends thereof, a control member for said pair of gripping jaws slidably carried by said carrier frame and extending thereabove, a pair of parallel coil springs carried by and each abutting at one end on said positioning member in laterally spaced relation and bearing against said control member to urge said control member vertically upwardly from said carrier frame and said positioning member downwardly, said coil springs permitting movement of both of said members towards said carrier frame, a connecting means having lost-motion therein in a generally vertical direction operatively engaging said control member and received in each of said coil springs but protruding from the lower ends thereof, a plurality of link means operatively securing the lower ends of said connecting means individually to said gripping jaws, and spring means engaging said last-named means and urging said gripper jaws to their open position, said spring means and said coil springs normally cooperating to prevent lost-motion in said connecting means and to position said gripper jaws in an article grasping position.

13. In bottle or article gripping apparatus, a carrier frame, a positioning member secured to said carrier frame and extending downwardly therefrom for limited pivotal and vertical movement in a plane towards and away from said carrier frame, a pair of gripping jaws pivotally secured to said positioning member adjacent the lower end thereof, a control member for said pair of gripping jaws slidably carried by said carrier frame and extending thereabove, a pair of parallel coil springs carried by said positioning member and compressed between said positioning member and said control member to urge each away from said carrier frame in opposite vertical directions but to permit either or both of such members to move towards said carrier frame, and connecting means including a resilient member and a pair of elongate longitudinally slotted links engaging said control member by pin means extending through said slots, said links being individually pivotally and operably connected to said pair of gripping jaws to move said jaws by action of said resilient member to an article release position upon relative movement of one of said members relative to said carrier frame.

14. In a bottle, or article gripping apparatus, a carrier bar, a positioning means including a pair of frames extending downwardly from said carrier bar, means pivotally securing said frame to said carrier bar for movement in a plane, a pair of spaced gripper jaws pivotally carried by but extending downwardly from said pair of frames, a control member slidably carried by said carrier bar and protruding both upwardly and downwardly therefrom, said control member being received between each of said pair of frames, spring means carried by said pair of frames and engaging said control member and said pair of frames for movement of both said control member and said pair of frames toward and away from said carrier bar, and connecting means including a resilient member operatively extending between and connecting said control member to said gripper jaws to move them from a normal bottle gripping position to an open bottle releasing position when said control member is moved towards said pair of frames, said connecting means having lost-motion means therein to permit said pair of frames to be moved upwardly towards said carrier bar by a misalignment between the apparatus and an article to be gripped by said gripper jaws to permit said pair of frames to pivot on said carrier bar and aid said gripper jaws in locating a said article.

15. In a bottle, or article gripping apparatus, a carrier bar, a positioning means including a pair of frames extending downwardly from said carrier bar, means pivotally securing said pair of frames to said carrier bar for movement in a plane, a pair of spaced gripper jaws pivotally carried by but extending downwardly from said pair of frames, a control member slidably carried by said carrier bar and protruding both upwardly and downwardly therefrom, said control member being received between each of said pair of said frames, a pair of parallel laterally spaced coil spring means carried by said pair of frames and engaging said control member and said pair of frames for movement of both said control member and said pair of frames toward and away from said carrier bar, and a pair of connecting means each having a section received within one of said coil springs and operatively extending between and connecting said control member to said gripper jaws to move them from a locked bottle gripping position to an open position when said control member is moved downwardly towards said pair of frames, said connecting means having lost-motion means therein to permit said pair of frames to be moved upwardly towards said carrier bar by a misalignment between the apparatus and an article to be gripped by said gripper jaws to permit said pair of frames to pivot laterally on said carrier bar by compressing one of said coil springs and aid said gripper jaws in locating a said article, said coil springs resiliently centering said pair of frames normally with relation to said carrier bar.

16. In article transfer apparatus, a carrier frame;

a positioning member secured to said carrier frame including a pair of side plates and a cross plate secured to and extending between the side members intermediate the ends thereof, means securing said positioning member to said carrier frame to extend downwardly therefrom but being pivotally movable in one plane with relation to said carrier frame to aid in article locating and engaging action;

a control member extending upwardly from and slidably engaging said carrier frame;

a pair of coil springs corresponding ends of which engage said cross plate and extend upwardly therefrom in parallel relationship and engage said control member at their upper ends;

a pair of gripper jaws pivotally positioned on said positioning member;

a pair of lost-motion links individually received within said coil springs and operatively engaging said control member, said links extending through said cross plate, and means including a resilient member operatively connecting lower ends of said links to said gripper jaws to urge them normally to an open position, movement of said control member towards said positioning member permitting movement of said gripper jaws from a closed to an open position.

17. In article transfer apparatus, a carrier frame;

a positioning member secured to said carrier frame including a pair of side plates and a cross plate secured to and extending between the side members intermediate the ends thereof, means securing said positioning member to said carrier frame to extend downwardly therefrom but being pivotally and vertically movable in one plane with relation to said carrier frame to aid in article locating and engaging action;

a control member extending upwardly from and slidably engaging said carrier frame;

a pair of coil springs based on said cross plate and extending upwardly therefrom in parallel relationship, said spring means engaging said control member at their upper ends to urge it upwardly;

a pair of gripper jaws pivotally positioned on said positioning member;

a pair of lost-motion links individually telescopically received in said coil springs and extending through said cross plate, means securing said link to said control member for lost-motion therebetween, and means including a resilient member operatively connecting lower ends of said links to said gripper jaws to urge them normally to an open position, movement of said control member towards said carrier frame releasing said gripper jaws for movement from a closed to an open position by said resilient member.

18. In a bottle, or article gripping apparatus, a positioning member including a carrier frame, a pair of spaced gripper jaws at least one of which is pivotally positioned and with both jaws being operatively carried by but extending downwardly from said carrier frame, said gripper jaws being movable laterally of said carrier frame, a control member slidably carried by said carrier frame, means including a pair of coil springs operatively securing said control member to said carrier frame for movement of said control member toward and away from said carrier frame, connecting means including a resilient member and a pair of lost-motion links operatively extending between and connecting said control member to at least the one pivotally positioned gripper jaw to move it from a locked bottle gripping position to an open bottle engaging position when said control member is moved towards said carrier frame, said resilient member urging said links downwardly and said gripper jaw to its open position at all times, and said coil springs operatively engaging said links to urge them upwardly.

References Cited in the file of this patent

UNITED STATES PATENTS

| | | |
|---|---|---|
| 1,160,405 | Henry | Nov. 16, 1915 |
| 1,733,547 | Lorenz | Oct. 29, 1929 |
| 1,808,689 | Stenhouse | June 2, 1931 |
| 2,404,460 | Rolker | July 23, 1946 |
| 2,783,869 | Thurman | Mar. 5, 1957 |
| 2,958,556 | Samuelson et al. | Nov. 1, 1960 |
| 3,033,387 | Greenberg | May 8, 1962 |